United States Patent
Kama et al.

(10) Patent No.: US 10,351,202 B2
(45) Date of Patent: Jul. 16, 2019

(54) TRAVELING APPARATUS

(71) Applicant: TOYOTA JIDOSHA KABUSHIKI KAISHA, Toyota-shi, Aichi-ken (JP)

(72) Inventors: Takeshi Kama, Nagakute (JP); Makoto Kakuchi, Toyota (JP); Makoto Mori, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 185 days.

(21) Appl. No.: 15/675,858

(22) Filed: Aug. 14, 2017

(65) Prior Publication Data

US 2018/0065698 A1    Mar. 8, 2018

(30) Foreign Application Priority Data

Sep. 7, 2016 (JP) ................. 2016-175042

(51) Int. Cl.
*B62K 5/025* (2013.01)
*B62K 5/06* (2006.01)
*B62K 21/02* (2006.01)
*B62K 25/02* (2006.01)

(52) U.S. Cl.
CPC ............... *B62K 5/025* (2013.01); *B62K 5/06* (2013.01); *B62K 21/02* (2013.01); *B62K 25/02* (2013.01); *B60Y 2200/43* (2013.01)

(58) Field of Classification Search
CPC ....... B62K 5/025; B62K 5/10; B60Y 2200/43
See application file for complete search history.

(56) References Cited

U.S. PATENT DOCUMENTS

| | | | | |
|---|---|---|---|---|
| 9,517,807 | B2* | 12/2016 | Takano | ............ B60G 3/01 |
| 9,809,273 | B2* | 11/2017 | Barenbrug | ............ B62K 13/00 |
| 10,207,762 | B2* | 2/2019 | Takenaka | ............ B62K 5/10 |
| 2006/0131091 | A1* | 6/2006 | Lin | ............ B62K 15/008 |
| | | | | 180/208 |
| 2008/0116665 | A1 | 5/2008 | Nakaizumi et al. | |
| 2009/0289437 | A1* | 11/2009 | Steinhilber | ............ B62K 5/02 |
| | | | | 280/282 |

(Continued)

FOREIGN PATENT DOCUMENTS

| | | |
|---|---|---|
| JP | 1-106717 A | 4/1989 |
| JP | 2002325878 A | 11/2002 |

(Continued)

*Primary Examiner* — Nicole T Verley
(74) *Attorney, Agent, or Firm* — Sughrue Mion, PLLC

(57) ABSTRACT

In a traveling apparatus, a front wheel supporting member is coupled to a rear wheel supporting member rotatably around a pivot axis and with a support shaft in such a way that a wheel base length will become variable according to a relative posture of the front wheel supporting member and the rear wheel supporting member. Control is performed so that the greater the wheel base length, the greater a speed of the traveling apparatus in a forward direction will become. When the wheel base length is one at which the speed in the forward direction becomes substantially zero, while the front wheel is oriented in a straight traveling direction, an intersection point where the pivot axis crosses a road surface is located at a position offset from a grounding point where the front wheel is grounded on the road surface toward a side of the rear wheel.

4 Claims, 6 Drawing Sheets

(56) References Cited

U.S. PATENT DOCUMENTS

| | | | |
|---|---|---|---|
| 2012/0012413 A1* | 1/2012 | Tsai | B62K 3/005 |
| | | | 180/209 |
| 2012/0101703 A1 | 4/2012 | Morita | |
| 2014/0008138 A1 | 1/2014 | Kim et al. | |
| 2016/0355231 A1* | 12/2016 | Barenbrug | B62K 13/00 |
| 2018/0043958 A1* | 2/2018 | Kama | B62K 5/025 |
| 2018/0338877 A1* | 11/2018 | Kano | A61G 5/047 |

FOREIGN PATENT DOCUMENTS

| | | | | |
|---|---|---|---|---|
| JP | 2005-231415 A | 9/2005 | | |
| JP | 5316640 B2 | 10/2013 | | |
| WO | WO-2018150108 A1 * | 8/2018 | | B60L 11/00 |

\* cited by examiner

TRAVELING APPARATUS

CROSS REFERENCE TO RELATED APPLICATIONS

This application is based upon and claims the benefit of priority from Japanese patent application No. 2016-175042, filed on Sep. 7, 2016, the disclosure of which is incorporated herein in its entirety by reference.

BACKGROUND

The present invention relates to a traveling apparatus on which a user rides and that travels.

Nowadays, personal mobility vehicles have been attracting attention. A personal mobility vehicle is often manufactured in a small size in view of maneuverability, which raises a problem that it lacks travel stability when traveling at a high speed. In order to improve travel stability of vehicles, including personal mobility vehicles but not limited thereto, vehicles having adjustable wheel base lengths have been suggested (e.g., Japanese Unexamined Patent Application Publication Nos. H1-106717 and 2005-231415).

SUMMARY

The vehicles with adjustable wheel base lengths, which have heretofore been suggested, accelerate when the wheel base lengths are increased and decelerate when the wheel base lengths are decreased. On the other hand, personal mobility vehicles are sometimes turned on the spot so as to change their directions in a small space such as in an elevator.

However, in the above vehicle, if the wheel base length is not increased, driving wheels are not driven, and thus the vehicle cannot speed. Therefore, in order to turn the vehicle on the spot, there has been a problem that it is necessary for a user to continuously perform an operation of increasing the wheel base length and an operation of rotating the steering wheel, thereby making the operation of turning the vehicle on the spot become complicated The present invention has been made to solve such a problem and provides a traveling apparatus that can be turned on the spot without making the user to perform the complicated operation.

In an example aspect of the present invention, a traveling apparatus on which a user rides when traveling includes:

a front wheel serving as a steering wheel;

a rear wheel;

a front wheel supporting member configured to rotatably support the front wheel;

a rear wheel supporting member configured to rotatably support the rear wheel; and a driving unit configured to drive at least one of the front wheel and the rear wheel.

The front wheel supporting member and the rear wheel supporting member are coupled to each other with a supporting shaft interposed therebetween in such a way that a wheel base length between the front wheel and the rear wheel will become variable according to a relative posture of the front wheel supporting member and the rear wheel supporting member.

The front wheel supporting member is coupled to the rear wheel supporting member rotatably around a pivot axis.

Control is performed so that the greater the wheel base length, the greater a speed of the traveling apparatus in a forward direction achieved by driving the driving unit will become.

The pivot axis is configured such that, when a relative posture of the front wheel supporting member and the rear wheel supporting member is a posture for the wheel base length at which the speed in the forward direction will become substantially zero, while the front wheel is oriented in a straight traveling direction, an intersection point where the pivot axis crosses a road surface is located at a position offset from a grounding point where the front wheel is grounded on the road surface toward a side of the rear wheel.

With such a configuration, when the user rotates the front wheel serving as the steering wheel by 90 degrees, the pivot axis is shifted in a direction moving away from the rear wheel, and the wheel base length is slightly increased from a shortest one, so that the traveling apparatus can speed. Thus, the user can turn the traveling apparatus on the spot. Accordingly, in order to turn the traveling apparatus on the spot, the user only has to rotate the front wheel. That is, the user does not have to perform the above complicated operation.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Hereinafter, although the present invention will be described with reference to embodiments of the invention, the invention according to claims is not limited to the following embodiments. Moreover, all the components described in the following embodiments are not necessarily indispensable for means to solve problems.

First Embodiment

Figure 1:
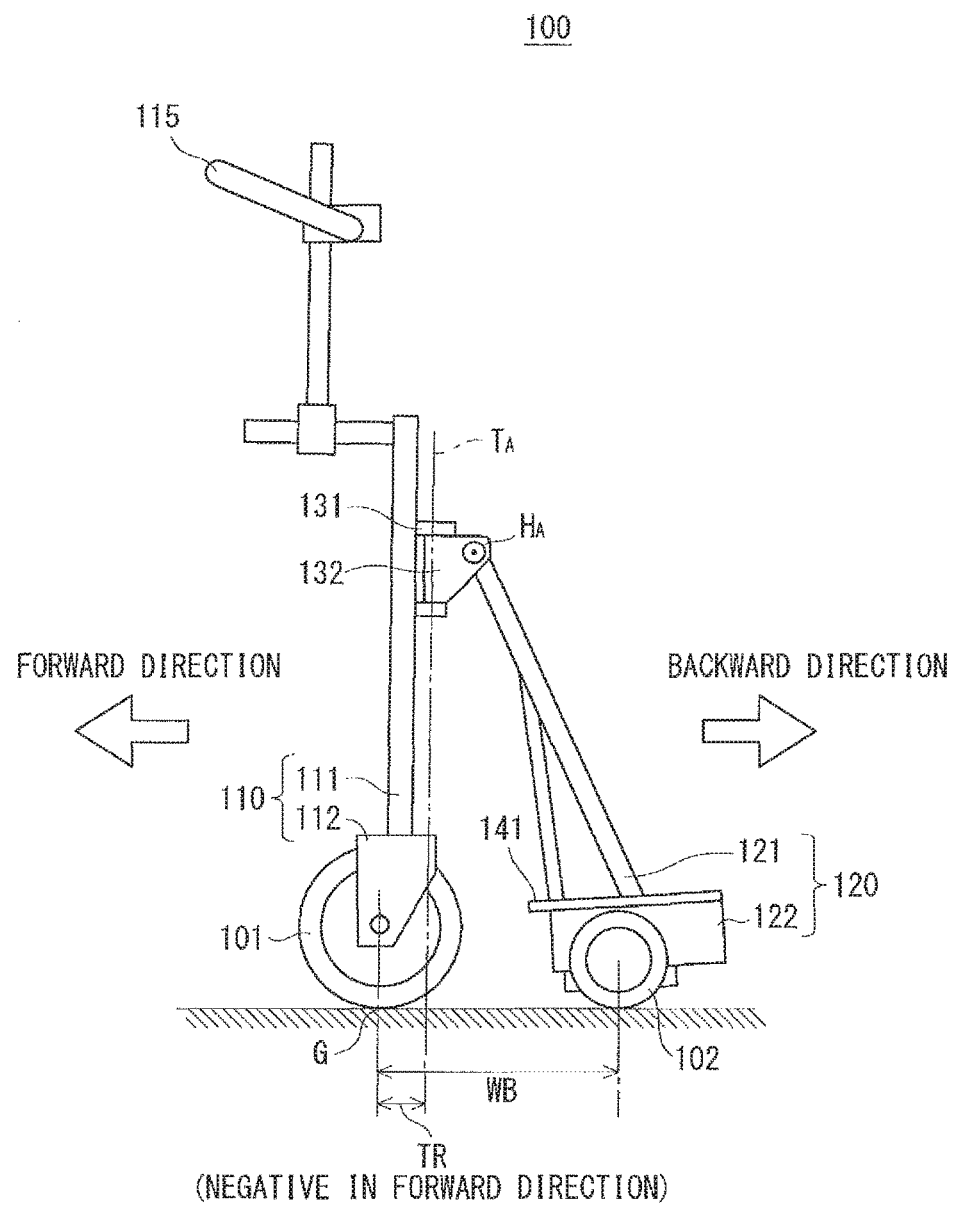
FIG. 1 is a lateral overview diagram of a traveling apparatus according to a first embodiment when a WB length is shortest.

A first embodiment will be described. FIG. 1 is a lateral overview diagram of a traveling apparatus 100 according to the first embodiment.

The traveling apparatus 100 is one kind of personal mobility vehicle and is an electrically operated mobile vehicle in which a user stands when he or she rides on the traveling apparatus 100. The user places his or her feet on a step 141 to ride on the traveling apparatus 100.

The traveling apparatus 100 includes, with respect to the traveling direction, one front wheel 101 and two rear wheels 102 (right rear wheel 102a and left rear wheel 102b, which will be described later). An orientation of the front wheel 101 is changed when the user operates a handlebar 115. The front wheel 101 functions as a steering wheel. The two rear wheels 102 are coupled by a wheel axis (not shown) and driven by a driving unit composed of a motor and a deceleration mechanism (not shown). The two rear wheels 102 function as driving wheels. The traveling apparatus 100 is grounded at three points by the three wheels and is a statically stable vehicle that is self-supported even when the traveling apparatus 100 is parked without the user riding thereon.

The front wheel 101 is rotatably supported by a front wheel supporting member 110. The front wheel supporting member 110 includes a front pole 111 and a fork 112. The fork 112 is fixed to one end of the front pole 111 and sandwiches the front wheel 101 to rotatably support the front wheel 101 on both of its sides. The handlebar 115 is extended in the rotation axis direction of the front wheel 101 and fixed to the other end of the front pole 111. When the user turns the handlebar 115, the front pole 111 transmits a force of the operation to the front wheel 101 to change its orientation.

The rear wheels 102 are rotatably supported by a rear wheel supporting member 120. The rear wheel supporting member 120 includes a rear pole 121 and a body part 122. The body part 122 fixes and supports one end of the rear pole 121 and rotatably supports the two rear wheels with the wheel axis (not shown) interposed between the two rear wheels 102. The body part 122 also functions as a housing that accommodates the above-mentioned driving unit composed of the motor and deceleration mechanism, and a battery etc. that supplies power to the motor. The above-mentioned step 141 is provided on the upper surface of the body part 122.

The front wheel supporting member 110 and rear wheel supporting member 120 are coupled to each other with a pivot joint 131 and a hinge joint 132 interposed therebetween. The pivot joint 131 is fixed to the front pole 111 that constitutes the front wheel supporting member 110 at a position near the other end of the front pole 111 to which the handlebar 115 is fixed. Further, the pivot joint 131 is pivotally arranged on the hinge joint 132 and rotates in relation to the hinge joint 132 around a pivot axis $T_A$, which is disposed parallel to the direction in which the front pole 111 is extended. The hinge joint 132 is pivotally arranged on one end of the rear pole 121, which constitutes the rear wheel supporting member 120, that is opposite to an end of the rear pole 121 supported by the body part 122. The hinge joint 132 rotates in relation to the rear pole 121 around a hinge axis (support shaft) $H_A$, which is disposed parallel to the direction in which the wheel axis (not shown) for coupling the two rear wheels 102 is extended.

With such a structure, when the user turns the handlebar 115, the front wheel supporting member 110 revolves around the pivot axis $T_A$ with respect to the rear wheel supporting member 120, so that the orientation of the front wheel 101 can be changed. Moreover, when the user tilts the handlebar 115 forward in a forward direction, the front wheel supporting member 110 and rear wheel supporting member 120 rotate in relation to each other around the hinge axis $H_A$ and a relative posture of the front wheel supporting member 110 and rear wheel supporting member 120 is changed, so that an angle formed by the front pole 111 and rear pole 121 can be made smaller. When the angle formed by the front pole 111 and rear pole 121 is made small, a WB length, which is a distance of a wheel base (WB) between the front wheel 101 and rear wheels 102 will become shorter. On the contrary, when the user tilts the handlebar 115 backward in the forward direction, the front wheel supporting member 110 and rear wheel supporting member 120 rotate in relation to each other around the hinge axis $H_A$ and the relative posture of the front wheel supporting member 110 and rear wheel supporting member 120 is changed, so that the angle formed by the front pole 111 and rear pole 121 can be made larger. When the angle formed by the front pole 111 and rear pole 121 increases, the WB length increases.

The traveling apparatus 100 is stopped when the WB length is shortest. On the handlebar 115, for example, a backward switch (not shown), which is a type of a switch for the user to manually operate, is provided. When the user turns on the backward switch on the handlebar 115 while the WB length is the shortest, the traveling apparatus 100 travels at a predetermined speed in the backward direction. The predetermined speed in the backward direction at this time is a constant low speed and is assumed to be, for example, 2.0 to 3.0 (km/h). However, it is not limited to this.

Figure 2:
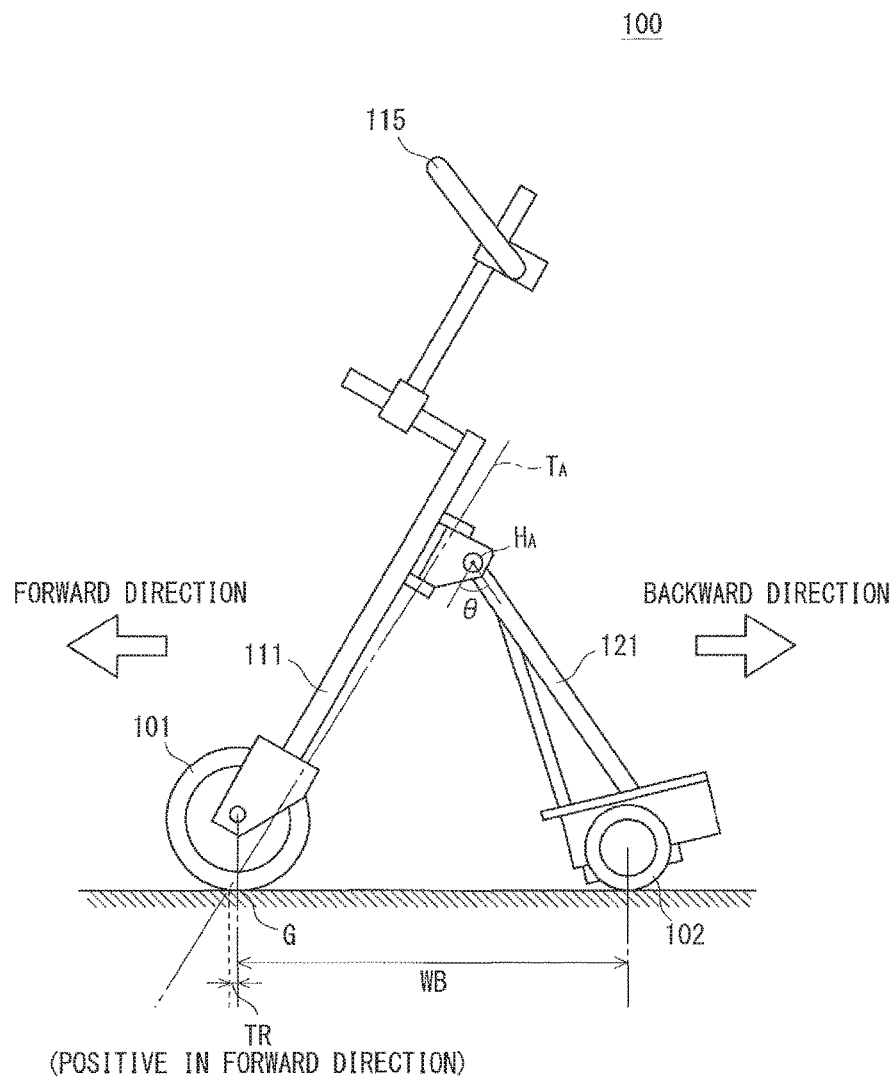
FIG. 2 is a lateral overview diagram of the traveling apparatus of FIG. 1 when the WB length is a predetermined length or greater.

On the other hand, the traveling apparatus 100 travels in the forward direction when the WB length is not the shortest. When the traveling apparatus 100 travels in the forward direction, the greater the WB length, the greater the speed in the forward direction will become. That is, the traveling apparatus 100 travels at a low speed in the forward direction when the WB length is short and travels at a high speed in the forward direction when the WB length is long. FIG. 1 shows the state when the WB length is the shortest. FIG. 2 is a lateral overview diagram of the traveling apparatus 100 in the state similar to that in FIG. 1, except that the WB length is not the shortest. Specifically, FIG. 2 shows the state of the traveling apparatus 100 when the WB length is a predetermined length or greater (which will be described later) and is longest or close to the longest. Both FIGS. 1 and 2 show the state when the front wheel 101 is oriented in a straight traveling direction.

As shown in FIG. 2, a direction in which the angle formed by the front pole 111 and rear pole 121 around the hinge axis $H_A$ relatively increases shall be positive, and a rotation angle shall be θ. Further, a minimum value the rotation angle θ can take (minimum angle) shall be $θ_{MIN}$, and a maximum value the rotation angle θ can take (maximum angle) shall be $θ_{MAX}$. For example, $θ_{MIN}$ is 10 degrees, and $θ_{MAX}$ is 80 degrees. In other words, a structural control member is provided so that the rotation angle θ falls within a range between $θ_{MIN}$ and $θ_{MAX}$.

The WB length corresponds one-to-one to the rotation angle θ and can be calculated by the function, WB length=f (θ). Therefore, the WB length can be adjusted by changing the rotation angle θ. The traveling apparatus 100 accelerates in the forward direction when the user increases the rotation angle θ and decelerates in the forward direction when the user reduces the rotation angle θ. That is, the target speed in the forward direction is associated with the rotation angle θ, and a change in the rotation angle θ causes the traveling apparatus 100 to accelerate/decelerate in the forward direction in order to reach the target speed associated with the changed rotation angle θ. In other words, the rotation angle θ is used as a parameter to associate the WB length with the target speed, and when the user adjusts the WB length, the target speed is changed according to the adjusted WB length. When the rotation angle θ is at the minimum value, i.e., when the WB length is the shortest, the target speed is 0 (km/h). On the other hand, when the rotation angle θ is at the maximum value, i.e., when the WB length is the longest, the target speed is assumed to be, for example, 20.0 (km/h), but it is not limited to this.

As described above, when the rotation angle θ is increased and the WB length is increased, the traveling apparatus 100 accelerates in the forward direction, when the rotation angle θ is reduced and the WB length is reduced, the traveling apparatus 100 decelerates in the forward direction, and when the WB length becomes the shortest, the traveling apparatus 100 is stopped.

By the way, it is considered that the traveling apparatus 100 is turned on the spot often from a state where the traveling apparatus 100 is stopped. However, in order to turn the traveling apparatus 100 on the spot, it is necessary to increase the WB length from the shortest so that the traveling apparatus 100 can speed at a certain speed. In such a case, if it is necessary to continuously perform an operation of increasing the WB length and an operation of rotating the front wheel 101, the operation of turning the traveling apparatus 100 on the spot becomes complicated.

Further, since a traveling direction of a majority of common mobility vehicles such as bicycles, automobiles, etc. is the forward direction, the straight traveling stability of the traveling apparatus 100 traveling in the forward direction is ensured by applying a trail, which will be described later, that becomes positive in the forward direction. On the other hand, in the traveling apparatus 100, which is a type of personal mobility vehicle traveling in a traveling space, the traveling direction is frequently switched between the forward direction and backward direction. Therefore, ensuring the straight traveling stability in only one direction is insufficient.

Figure 3:
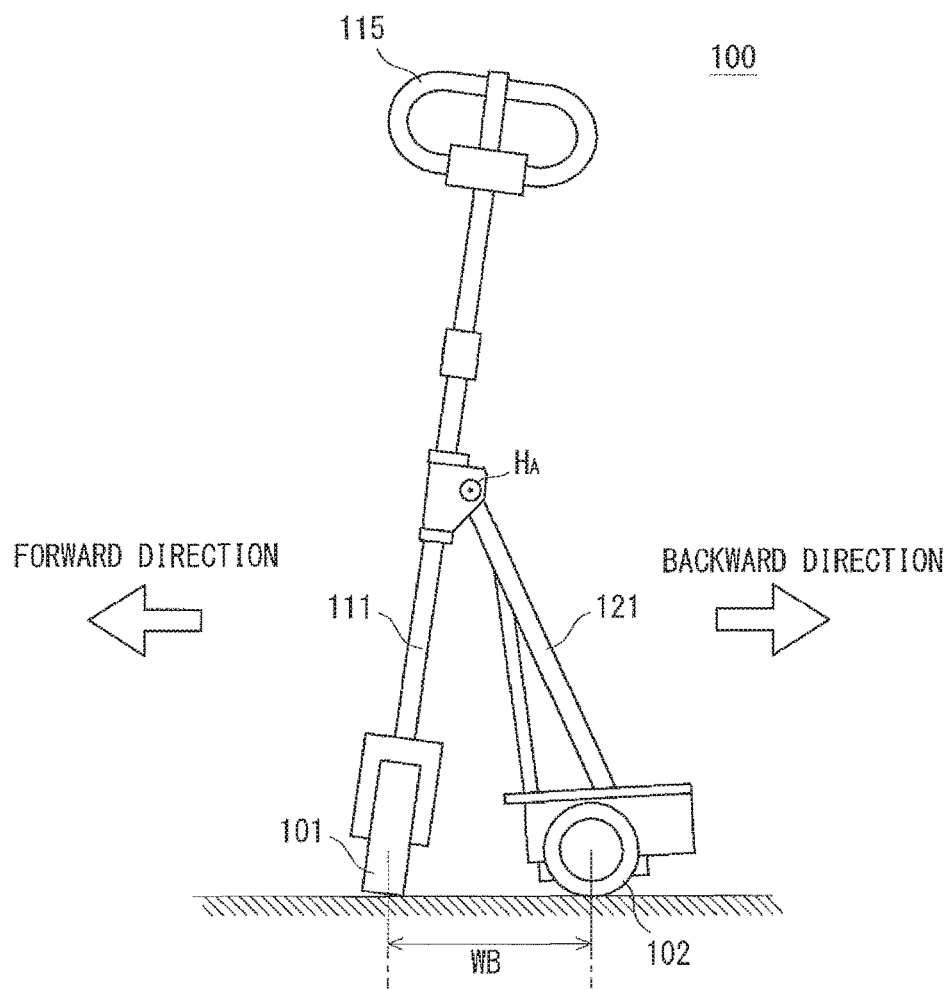
FIG. 3 is a lateral overview diagram of the traveling apparatus of FIG. 1 when a front wheel of the traveling apparatus is rotated by 90 degrees to the right.
Figure 4:
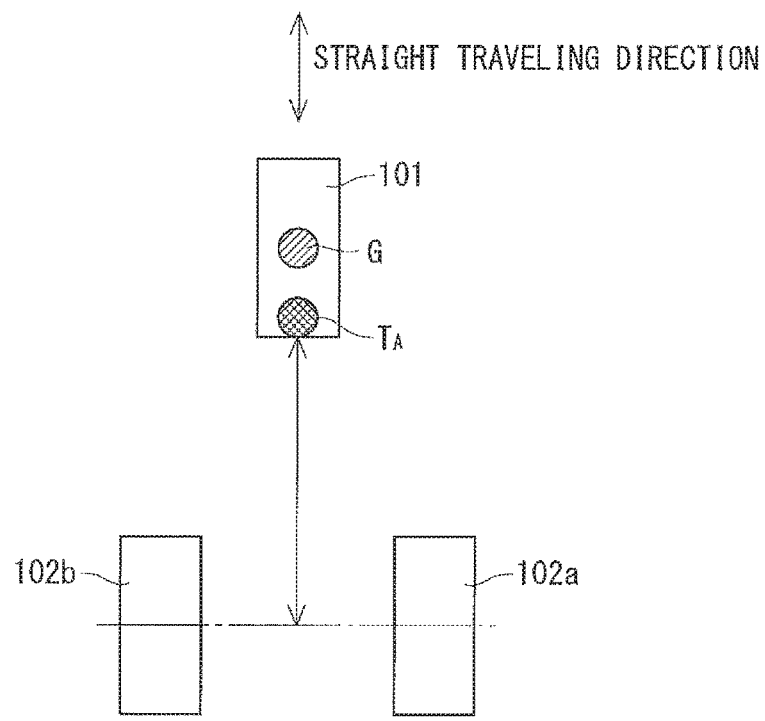
FIG. 4 is a top overview diagram of the traveling apparatus of FIG. 1.
Figure 5:
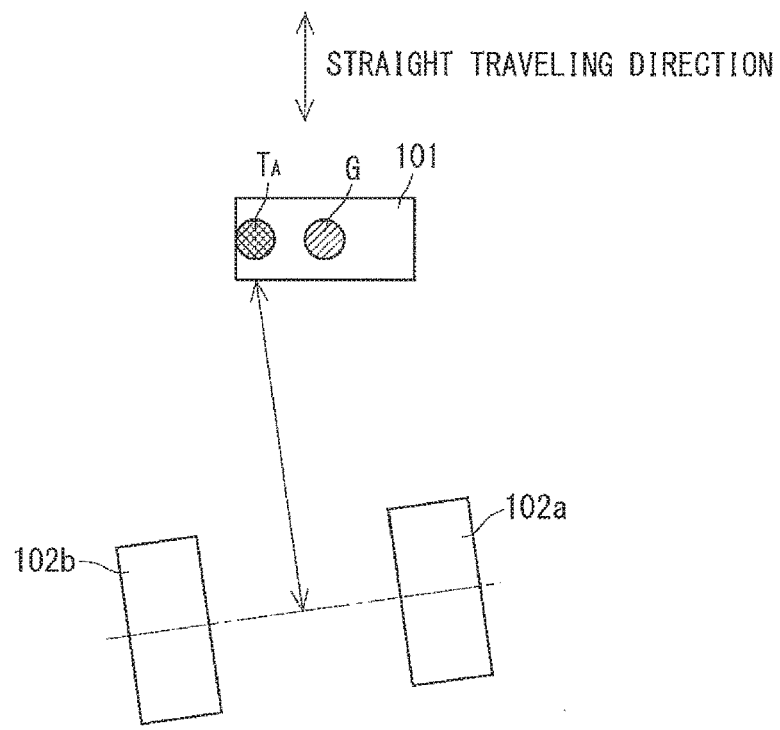
FIG. 5 is a top overview diagram of the traveling apparatus of FIG. 3.

Accordingly, the traveling apparatus 100 solves the above-mentioned problem by property applying a trail TR according to the WB length. The trail TR represents a distance between a grounding point G where the front wheel 101 is grounded on a road surface and an intersection point T where the pivot axis $T_A$ crosses the road surface. FIG. 3 is a lateral overview diagram of the traveling apparatus 100 in the state similar to that in FIG. 1 except that the front wheel 101 is rotated to the right with respect to the straight traveling direction by 90 degrees. FIGS. 4 and 5 are top overview diagrams of FIGS. 1 and 3, respectively. Note that in FIGS. 4 and 5, components other than the front wheel 101 and rear wheels 102 shown in FIGS. 1 and 3 are not shown.

As described above, the trail TR represents the distance between the grounding point G where the front wheel 101 is grounded on the road surface and the intersection point where the pivot axis $T_A$ crosses the road surface. In this specification, if the intersection point where the pivot axis $T_A$ crosses the road surface is located forward of the grounding point G where the front wheel 101 is grounded on the road surface in the traveling direction, the trail TR is defined as a positive trail in the traveling direction. On the contrary, if the intersection point where the pivot axis $T_A$ crosses the road surface is located backward of the grounding point G where the front wheel 101 is grounded on the road surface in the traveling direction, the trail TR is defined as a negative trail in the traveling direction.

Firstly, the trail TR when the WB length is the shortest will be described with reference to FIGS. 1, 3, and 5.

In the traveling apparatus 100, when the WB length is the shortest, the pivot axis $T_A$ is substantially vertical in the state where the front wheel 101 is oriented in the straight traveling direction (states shown in FIGS. 1 and 4). At this time, the intersection point where the pivot axis $T_A$ crosses the road surface is located at a position offset from the grounding point G where the front wheel 101 is grounded on the road surface toward the side of the rear wheels 102. Therefore, the trail TR is a negative trail in the forward direction. An amount of the trail TR at this time is assumed to be 50 mm to 90 mm, which is the same as an amount of trail of common bicycles. However, it is not limited to this.

In the state shown in FIGS. 1 and 4, when the user turns the handlebar 115, for example, to the right, the front wheel 101 is rotated to the right around the grounding point G. Thus, the pivot axis $T_A$ is rotated in the clockwise direction around the grounding point G where the front wheel 101 is grounded. The power generated by the rotation movement of the pivot axis $T_A$ is transmitted to the right rear wheel 102a and left rear wheel 102b via the hinge axis $H_A$ to move the right rear wheel 102a and left rear wheel 102b.

On the other hand, the right rear wheel 102a and left rear wheel 102b try to stay on the spot due to a driving force of the motor (not shown) or viscous resistance of the wheel axis (not shown) for coupling the right rear wheel 102a and left rear wheel 102b to each other. If this force of the right rear wheel 102a and left rear wheel 102b trying to stay on the spot is greater than the force of the WB length extended via the hinge axis $H_A$, the pivot axis $T_A$ is shifted in a direction moving away from the right rear wheel 102a and left rear wheel 102b by the above rotation movement. As a result, the WB length is slightly increased from the shortest. At this time, the right rear wheel 102a and left rear wheel 102b are also subjected to a force rotating to the left that is opposite to the rotation direction of the pivot axis $T_A$ due to the power of the rotation movement of the pivot axis $T_A$. The amounts of movement of the right rear wheel 102a and left rear wheel 102b at this time are determined according to the above-mentioned driving force of the motor or the above-mentioned viscous resistance of the wheel axis.

When the WB length becomes greater than the shortest, the right rear wheel 102a and left rear wheel 102b are driven so as to travel at the target speed corresponding to the WB length in the forward direction. Thus, the traveling apparatus 100 is turned with a turning radius corresponding to an angle of the pivot axis $T_A$.

Then, when the user turns the handlebar 115 until the front wheel 101 is rotated to the right with respect to the straight traveling direction by 90 degrees (states shown in FIGS. 3 and 5), the center of the turning is located near a midpoint between the right rear wheel 102a and left rear wheel 102b. As a result, the traveling apparatus 100 is turned on the spot. At this time, the right rear wheel 102a and left rear wheel 102b are rotated in rotation directions opposite to each other at the same rotation speed. The rotation speed at this time is determined according to the target speed corresponding to the WB length.

In the above description, the operation of rotating the front wheel 101 to the right has been described. However, like the above case, in order to rotate the front wheel 101 to the left, the pivot axis $T_A$ is rotated in the counterclockwise direction around the grounding point G where the front wheel 101 is grounded, and the pivot axis $T_A$ is shifted in the direction moving away from the right rear wheel 102a and left rear wheel 102b. As a result, the traveling apparatus 100 is turned on the spot.

As described above, in the traveling apparatus 100, when the WB length is the shortest and while the front wheel 101 is oriented in the straight traveling direction, the pivot axis $T_A$ is configured such that the intersection point where the pivot axis $T_A$ crosses the road surface is located at a position offset from the grounding point G where the front wheel 101 is grounded on the road surface toward the side of the rear wheels 102. Therefore, when the user rotates the front wheel 101 to the left or right by 90 degrees, the pivot axis $T_A$ is shifted in a direction moving away from the rear wheels 102. Thus, the WB length becomes slightly greater, and the traveling apparatus 100 can speed to thereby enable the traveling apparatus 100 to be turned on the spot. Accordingly, in order to turn the traveling apparatus 100 on the spot, the user only has to rotate the front wheel 101. That is, the user does not have to perform a complicated operation.

Further, as described above, the traveling apparatus 100 can also travel in the backward direction when the WB length is the shortest. When the user turns on the backward switch (not shown) on the handlebar 115 while the WB length is the shortest, the traveling apparatus 100 drives the right rear wheel 102a and left rear wheel 102b to travel at the predetermined speed in the backward direction. Since the trail TR is a positive trail in the backward direction at this time, the straight traveling stability of the traveling apparatus 100 traveling in the backward direction is ensured.

Next, the trail TR when the WB length is not the shortest will be described with reference to FIG. 2.

In the traveling apparatus 100, the greater the WB length of the traveling apparatus 100 from the shortest, the more obliquely inclined rearward the pivot axis $T_A$ becomes in the forward direction, so that the WB length becomes longer than the shortest. When the WB length becomes the predetermined length or greater while the front wheel 101 is oriented in the straight traveling direction (state shown in FIG. 2), the intersection point where the pivot axis $T_A$ crosses the road surface is located at a position offset from the grounding point G where the front wheel 101 is grounded on the road surface toward a side opposite to the rear wheels 102. Consequently, the positive and negative of the trail TR are reversed, and the trail TR will become a positive trail in the forward direction. Accordingly, when the traveling apparatus 100 travels in the forward direction in this state, the straight traveling stability of the traveling apparatus 100 traveling in the forward direction is ensured.

Note that, in traveling apparatus 100, the WB length (the above-mentioned predetermined length) at which the positive and negative of the trail TR are reversed may be any length. However, in the manner described above, if the positive and negative of the trail TR are reversed, and the trail TR becomes a positive trail in the forward direction, the straight traveling stability of the traveling apparatus 100 traveling in the forward direction can be ensured. For this reason, the above-mentioned predetermined length may preferably be a length close to the shortest. In the traveling apparatus 100, when the WB length is the predetermined length or greater, the longer the WB length, the greater the amount of the positive trail TR becomes in the forward direction. Therefore, the greater the vehicle speed, the more improved the straight traveling stability of the traveling apparatus 100 traveling in the forward direction will become.

As described above, in the traveling apparatus 100, the pivot axis $T_A$ is configured in such a way that when the WB length becomes the predetermined length or greater, the positive and negative of the trail TR are reversed, and the trail TR will become a positive trail in the forward direction. Thus, when the WB length is the shortest, the pivot axis $T_A$ becomes substantially vertical, and the trail TR becomes a negative trail in the forward direction. When the traveling apparatus 100 travels in the backward direction in this state, the trail TR will become a positive trail in the backward direction, and thus the straight traveling stability of the traveling apparatus 100 traveling in the forward direction is ensured. On the other hand, when the WB length of the traveling apparatus 100 is increased from the shortest, the pivot axis $T_A$ is inclined obliquely rearward in the forward direction. When the WB length becomes the predetermined length or greater, the positive and negative of the trail TR are reversed, and the trail TR will become a positive trail in the forward direction. Accordingly, the straight traveling stability of the traveling apparatus 100 traveling in the forward direction can be ensured. It is thus possible to ensure the straight traveling stability of the traveling apparatus 100 traveling in both the forward and backward directions.

In the traveling apparatus 100, when the WB length is the predetermined length or greater, the longer the WB length, the greater the amount of the positive trail TR becomes in the forward direction. Therefore, the greater the vehicle speed, the more improved the straight traveling stability of the traveling apparatus 100 traveling in the forward direction will become. Conversely, the lower the vehicle speed, the more improved the turning ability of the traveling apparatus 100 will become. Accordingly, the operation of turning the handlebar 115 will become difficult when the traveling apparatus 100 travels at a high speed, thereby generating a limitation in the turning movement. When the user suddenly turns the handlebar 115 while the traveling apparatus 100 is traveling at a high speed, the traveling apparatus 100 may not be able to support the centrifugal force exerted on the user, and thus the user may fall over. However, as the traveling apparatus 100 is configured in such a way that the operation of turning the handlebar 115 will become difficult when the traveling apparatus 100 is traveling at a high speed, it is possible to prevent the user from falling over. Moreover, the traveling apparatus 100 can facilitate the operation of turning the handlebar 115 when the traveling apparatus 100 is traveling at a low speed.

Figure 6:
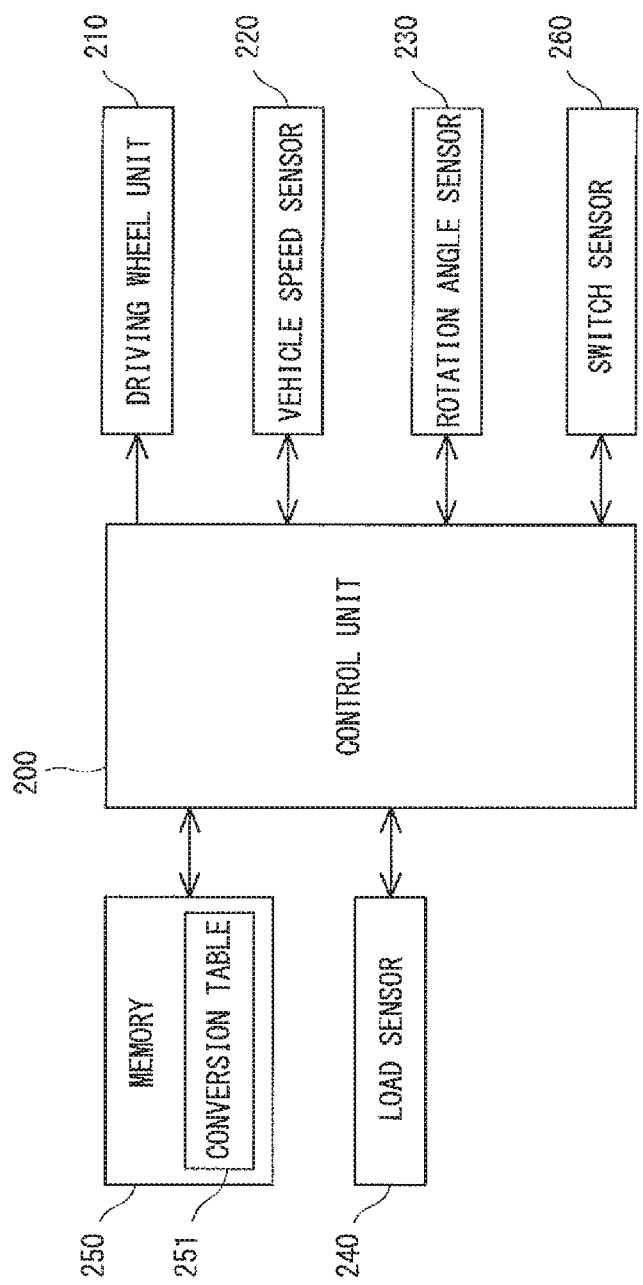
FIG. 6 is a control block diagram of the traveling apparatus according to the first embodiment.

FIG. 6 is a control block diagram of the traveling apparatus 100. A control unit 200 is, for example, a CPU and accommodated inside the body part 122. A driving wheel unit 210 includes a driving circuit and a motor for driving the two rear wheels 102, which are driving wheels. The driving wheel unit 210 is accommodated inside the body part 122. The control unit 200 sends driving signals to the driving wheel unit 210 to thereby control the rotations of the two rear wheels 102.

A vehicle speed sensor 220 monitors an amount of the rotation of the two rear wheels 102 or wheel axis (not shown) for coupling the two rear wheels 102 and detects the traveling direction and speed of the traveling apparatus 100. In response to a request from the control unit 200, the vehicle speed sensor 220 sends a result of the detection in a speed signal to the control unit 200. The rotation angle sensor 230 is, for example, a rotary encoder that detects the rotation angle θ formed by the front pole 111 and rear pole 121 around the hinge axis $H_A$. In response to a request from the control unit 200, the rotation angle sensor 230 sends a result of the detection in a rotation angle signal to the control unit 200.

A load sensor 240 is, for example, a piezoelectric film that detects a load applied on the step 141, and is embedded in the step 141. In response to a request from the control unit 200, the load sensor 240 sends a result of the detection in a load signal to the control unit 200.

A switch sensor 260 is a sensor that detects whether or not the backward switch (not shown) on the handlebar 115 has been turned on. The switch sensor 260 is embedded in the handlebar 115. In response to a request from the control unit 200, the switch sensor 260 sends a result of the detection in a switch signal to the control unit 200.

A memory 250 is a non-volatile storage medium and is, for example, a solid state drive. The memory 250 stores not only a control program for controlling the traveling apparatus 100 but also various parameter values, functions, lookup tables, and the like used for the control. The memory 250 stores a conversion table 251 for converting a rotation angle into a target speed.

The conversion table 251 shows a relationship between the rotation angle θ and target speed. In the conversion table 251, the target speed in the forward direction is configured to become greater as the rotation angle θ increases. The conversion table 251 may be a function format that expresses the target speed in the forward direction as a function of the rotation angle θ. However, the format of the conversion table 251 is not limited to this.

Figure 7:
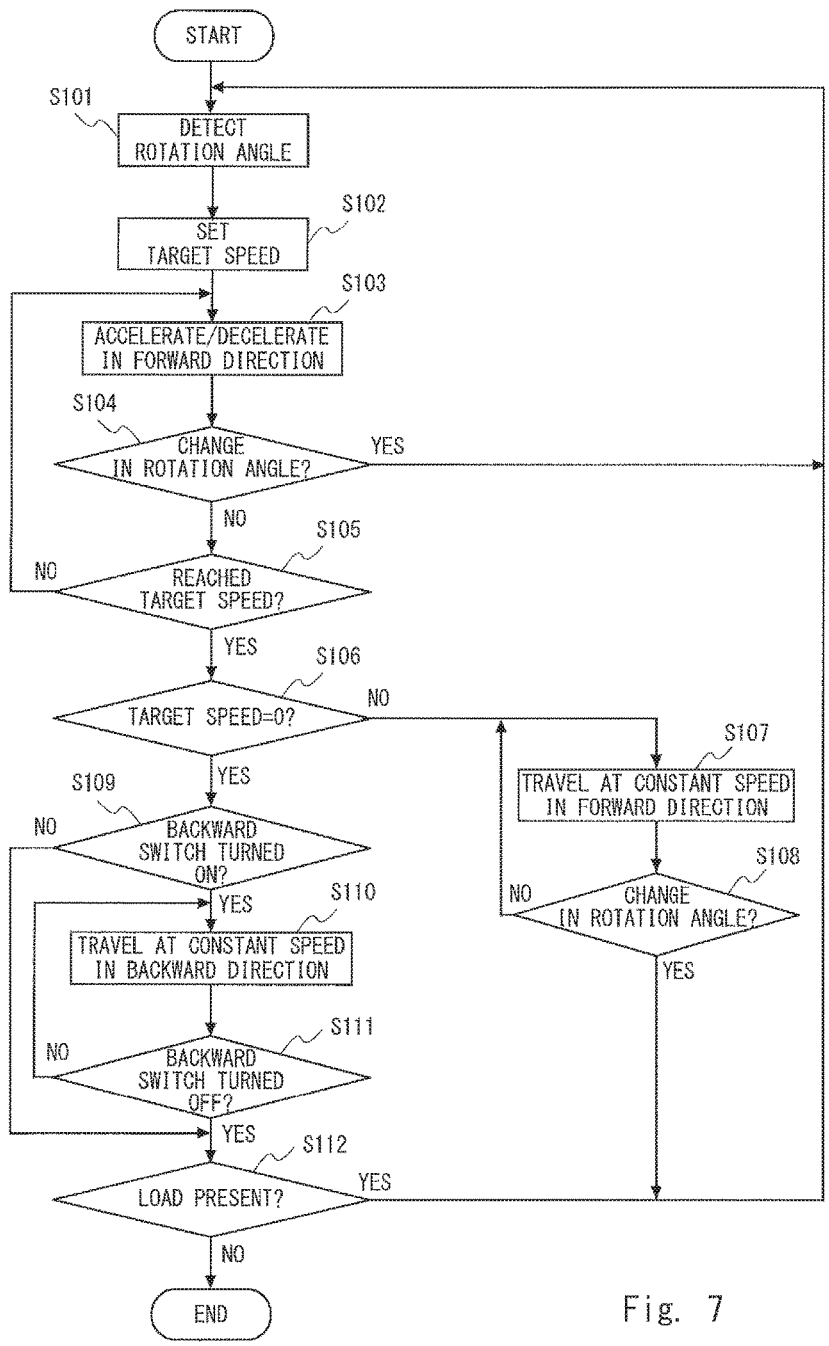
FIG. 7 is a flowchart showing a process while the traveling apparatus is traveling.

Next, a traveling process according to the first embodiment will be described. FIG. 7 is a flowchart showing a process performed while the traveling apparatus 100 is traveling. The flow of FIG. 7 is started when a power switch is turned on and a signal indicating that a load is present is received from the load sensor 240, i.e., when the user rides on the traveling apparatus 100.

In Step S101, the control unit 200 obtains the rotation angle signal from the rotation angle sensor 230 and calculates the current rotation angle θ. In Step S102, the calculated rotation angle θ is applied to the conversion table 251, which has been read out from the memory 250, to set the target speed in the forward direction. At this time, when the rotation angle θ is at the minimum value, the target speed in the forward direction will become 0 (km/h).

When the control unit 200 sets the target speed in the forward direction, it proceeds to Step S103 and sends the driving signal for acceleration or deceleration in the forward direction to the driving wheel unit 210. Specifically, the control unit 200 firstly receives the speed signal from the vehicle speed sensor 220 and checks the current speed in the forward direction. If the target speed is greater than the current speed, the control unit 200 sends the driving signal for acceleration to the driving wheel unit 210, whereas if the target speed is less than the current speed, the control unit 200 sends the driving signal for deceleration to the driving wheel unit 210. At this time, if the current rotation angle θ remains zero from when the user has started to ride on the traveling apparatus 100, the target speed is still 0 (km/h). Thus, the traveling apparatus 100 will neither accelerate nor decelerate.

The control unit 200 monitors whether or not the rotation angle θ has changed during acceleration or deceleration in the forward direction, that is, whether or not the user has tilted the handlebar 115 forward or backward (Step S104). If the control unit 200 determines that the rotation angle θ has changed, it starts the process from Step S101 again. If the control unit 200 determines that the rotation angle θ has not changed, it proceeds to Step S105.

In Step S105, the control unit 200 receives the speed signal from the vehicle speed sensor 220 and evaluates whether or not the current speed has reached the target speed in the forward direction. If the control unit 200 determines that the current speed has not reached the target speed, it returns to Step S103, and the acceleration or deceleration in the forward direction is continued. If the control unit 200 determines that the current speed has reached the target speed in the forward direction, it proceeds to Step S106. In Step S106, the control unit 200 checks whether or not the target speed is 0 (km/h). If the target speed is 0 (km/h), it means that the traveling apparatus 100 is stopped at the time of Step S106. Otherwise, the traveling apparatus 100 is traveling at the target speed in the forward direction, and thus the control unit 200 sends, to the driving wheel unit 210, the driving signal for maintaining the traveling apparatus 100 to travel at the speed in the forward direction (Step S107).

Even while the traveling apparatus 100 is traveling at a constant speed in the forward direction in Step S107, the control unit 200 monitors whether or not the rotation angle θ has changed, that is, whether or not the user has tilted the handlebar 115 forward or backward (Step S108). If the control unit 200 determines that the rotation angle θ has changed, it returns to Step S101. If the control unit 200 determines that the rotation angle θ has not changed, it returns to Step S107 to continue traveling at the constant speed.

If the control unit 200 confirms that the target speed is 0 (km/h) in Step S106, it proceeds to Step S109 and evaluates whether the user has turned on the backward switch based on the switch signal received from the switch sensor 260. If the control unit 200 determines that the user has not turned on the backward switch, it proceeds to Step S112. If the control unit 200 determines that the user has turned on the backward switch, it sends the driving signal for traveling in the backward direction at a predetermined speed to the driving wheel unit 210 (Step S110). To be more specific, the control unit 200 transmits the driving signal for acceleration to the driving wheel unit 210 until the current speed in the backward direction reaches the predetermined speed, while checking the current speed in the backward direction based on the speed signal received from the vehicle speed sensor 220. When the current speed in the backward direction reaches the predetermined speed, the control unit 200 sends, to the driving wheel unit 210, the driving signal for maintaining the traveling apparatus 100 to travel at the speed in the backward direction.

The control unit 200 monitors whether or not the user has turned off the backward switch while the traveling apparatus 100 is traveling at a constant speed in the backward direction in Step S110 (Step S111). If the control unit 200 determines that the user has not turned off the backward switch, it returns to the Step S110 so that the traveling apparatus 100 continues to travel at the constant speed in the backward direction. If the control unit 200 determines that the user has turned off the backward switch, it proceeds to Step S112.

In Step S112, the control unit 200 evaluates whether the user gets off the traveling apparatus based on the load signal received from the load sensor 240. If the control unit 200 determines that the user has not got off the traveling apparatus 100, i.e., determines that a load is present, it returns to Step S101 to continue the travel control. If the control unit 200 determines that the user has got off the traveling apparatus 100, a series of operations is ended.

Other Embodiments

Note that the present invention is not limited to the above embodiment, and modifications may be made as appropriate without departing from the scope of the invention. For example, the traveling apparatus may not be a stationary stable vehicle that is self-supported. Moreover, the front and rear wheels may not be wheels and may instead be ground-contacting elements such as spherical wheels, a crawler, or the like. Furthermore, the driving wheels may not be rear wheels and instead may be the front wheel. Moreover, a power source for driving the driving wheels is not limited to a motor and instead may be a gasoline engine or the like. The backward switch may not be provided on the handlebar and may not be manually operated. For example, the backward switch may be provided on the step and may be operated by a foot.

When the WB length is the shortest, the traveling apparatus may perform control to lock the rear wheels by the motor (not shown). By doing so, when the user performs the operation of rotating the front wheel, the pivot axis will be more surely shifted in a direction moving away from the rear wheels. It is thus expected that the effect of enabling the traveling apparatus to be turned on the spot only by rotating the front wheel will be more pronounced. Further, although, in the traveling apparatus, the positive and negative of the trail are reversed by obliquely inclining the pivot axis, the positive and negative of the trail may be reversed by different ways.

Further, in the traveling apparatus, when the WB length is the shortest, the speed in the forward direction becomes zero, and the trail will become a negative trail in the forward direction. When the backward switch is turned on at this time, the traveling apparatus is configured to travel at the predetermined speed in the backward direction. However, the traveling apparatus is not limited to this configuration. The traveling apparatus may be configured such that when the WB length becomes the one at which the speed in the forward direction will become substantially zero, and the trail will become a negative trail in the forward direction, the traveling apparatus travels at the predetermined speed in the backward direction if the backward switch is turned on at this time.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traveling apparatus on which a user rides when traveling, the traveling apparatus comprising:
   a front wheel serving as a steering wheel;
   a rear wheel;
   a front wheel supporting member configured to rotatably support the front wheel;
   a rear wheel supporting member configured to rotatably support the rear wheel; and
   a driving unit configured to drive at least one of the front wheel and the rear wheel, wherein
   the front wheel supporting member and the rear wheel supporting member are coupled to each other with a support shaft interposed therebetween in such a way that a wheel base length between the front wheel and the rear wheel will become variable according to a relative posture of the front wheel supporting member and the rear wheel supporting member,
   the front wheel supporting member is coupled to the rear wheel supporting member rotatably around a pivot axis,
   control is performed so that the greater the wheel base length, the greater a speed of the traveling apparatus in a forward direction achieved by driving the driving unit will become, and
   the pivot axis is configured such that, when a relative posture of the front wheel supporting member and the rear wheel supporting member is a posture for the wheel base length at which the speed in the forward direction will become substantially zero, while the front wheel is oriented in a straight traveling direction, an intersection point where the pivot axis crosses a road surface is located at a position offset from a grounding point where the front wheel is grounded on the road surface toward a side of the rear wheel.

2. The traveling apparatus according to claim 1, wherein the pivot axis is configured such that, when the relative posture of the front wheel supporting member and the rear wheel supporting member is a posture at which the wheel base length becomes a predetermined length or greater, while the front wheel is oriented in the straight traveling direction, the intersection point where the pivot axis crosses the road surface is located at a position offset from the grounding point where the front wheel is grounded on the road surface toward a side opposite to the rear wheel.

3. The traveling apparatus according to claim 2, wherein the pivot axis is configured such that, when the relative posture of the front wheel supporting member and the rear wheel supporting member is the posture at which the wheel base length becomes the predetermined length or greater, while the front wheel is oriented in the straight traveling direction, the greater the wheel base length, the greater a distance between the intersection point where the pivot axis crosses the road surface and the grounding point where the front wheel is grounded on the road surface will become.

4. The traveling apparatus according to claim 1, wherein when the relative posture of the front wheel supporting member and the rear wheel supporting member is the posture for the wheel base length at which the speed in the forward direction will become substantially zero, if a predetermined switch is turned on, the rear wheel is driven by the driving unit so that the traveling apparatus travels in a backward direction.

* * * * *